Aug. 9, 1932.  S. P. COWARDIN ET AL  1,871,115
METHOD OF OPERATING INTERNAL COMBUSTION ENGINES
Filed Dec. 15, 1926  6 Sheets-Sheet 2

INVENTORS
SAMUEL P. COWARDIN AND
HARRY A. COWARDIN
BY
ATTORNEYS.

Aug. 9, 1932.  S. P. COWARDIN ET AL  1,871,115
METHOD OF OPERATING INTERNAL COMBUSTION ENGINES
Filed Dec. 15, 1926   6 Sheets-Sheet 3

INVENTORS
SAMUEL P. COWARDIN AND
HARRY A. COWARDIN.
BY Toulmin & Toulmin,
ATTORNEYS.

Aug. 9, 1932.     S. P. COWARDIN ET AL     1,871,115
METHOD OF OPERATING INTERNAL COMBUSTION ENGINES
Filed Dec. 15, 1926     6 Sheets-Sheet 6

Patented Aug. 9, 1932

1,871,115

UNITED STATES PATENT OFFICE

SAMUEL P. COWARDIN AND HARRY A. COWARDIN, OF RICHMOND, VIRGINIA

METHOD OF OPERATING INTERNAL COMBUSTION ENGINES

Original application filed July 14, 1924, Serial No. 725,931. Divided and this application filed December 15, 1926. Serial No. 154,927.

This invention relates to an improved method of producing and introducing a fuel charge into an explosive engine to derive power from oils, preferably low-grade hydrocarbon oils.

This present application is a division of our pending application, Serial No. 725,931, filed July 14, 1924, with reference to the method branch of the invention set forth and claimed in that application.

This method comprises the step of producing the fuel ingredient of the charge by reducing such oil through atomization to a state or condition of fog when mixed with air less in quantity than the quantity of oil in the fog determined by weight of the air and oil; the step of introducing or injecting a charge of this oil and air fog into the cylinder of an explosive engine in an amount small compared with the quantity of pure air drawn into the cylinder for making the complete explosive charge; the step of effecting by pressure such injection of such fuel ingredient into the cylinder, preferably when the extent of the compression of the cylinder air is low, say only about 40 per cent. of its ultimate degree of compression—though the injection may be performed at any time after the cylinder air has entered the cylinder, on up to the period when the compression has reached nearly that degree which will cause ignition, according to the character of the engine and the character of the fuel oil, (as will be hereafter explained); the step of distributing the fuel ingredient through the cylinder air during the compression period between injection and ignition; the step of ignition effected initially by other means than auto-ignition, then followed by auto-ignition derived from the ultimate compression; or, the ignition may be continued by such other means, as by spark, but is preferably continued by auto-ignition.

Such are the major steps of our improved method. From this method we have derived very marked and unusual results in the utilization of cheap, low grades of fuel oils for the production when combined with air of an economical and high-powered explosive fuel for explosive engines. Among the results obtained are these:

(a) That it is feasible to practice our method in a successful manner in any type of explosive engine; this method being particularly adapted to the effective operation of comparatively light low pressure engines because of the lower compression adaptability of the method.

(b) That by our method fuels of the various kinds, from gasoline to and including the extreme crude oils, as also alcohol or other liquid fuels, may be successfully utilized; this utilization of the crude oils being our objective as to the fuel material.

(c) That we can start and continuously operate any given type of explosive engine with initial ignition, as by spark, followed by the employment thereafter only of auto-ignition with practically all fuels. Such fuels as gasoline, kerosene and the heavier fuel oils may be used interchangeably in our method, with or without such slight variations in the practical application of the method as are entirely within its scope and essentials.

(d) That by our method we can start an engine, in a cold state, without resort to the use of a starter; in which case we first ignite by spark, and then by the heat of compression.

(e) That by our method, we can dispense with the need and use of engine carburetors.

As illustrative of one type of explosive engine which may be started and operated by our method, and as illustrative of one type of atomizer by which the fuel oil can be reduced and mixed with air to form the fog ingredient we have included in the accompanying drawings a reproduction of the drawings in said parent case, Serial No. 725,931; supplementing them with certain diagrammatic illustrations which will facilitate an understanding of our method.

In these drawings:

Fig. 16 shows the device for controlling the fuel pressures;

Figs. 17 and 18 show in end and side elevation the cam operating the fuel atomizer valve;

Figs. 19 and 10 show in end and side elevation the gearing used for cylinder selection and for admitting the fuel supply;

Fig. 21 shows in vertical section the fuel atomizer;

Fig. 21-a shows a portion of the atomizer, partly in section and partly in elevation;

We shall first describe our method and the manner of its practice in a two-cycle engine, as illustrated in Figs. 2 to 6 inclusive, and then in a four-cycle engine illustrated in Figs. 7 to 12 inclusive, it being understood that the method is applicable also to engines having other cycles of operation; and we will later sufficiently describe the two-cycle engine with which we have more especially practiced our method, being the same construction of engine as that illustrated and set forth in said parent application, Serial No. 725,931.

In setting forth our method with reference to producing the fuel ingredient of our fuel charge; the manner of introducing this ingredient into an engine; the distribution during compression of such ingredient amongst the cylinder air; and the ignition of the whole charge, we will describe the several steps in their natural order or the order in which they take place in practice.

Figures 16, 17, 18, 19, 20, 21, 21A:
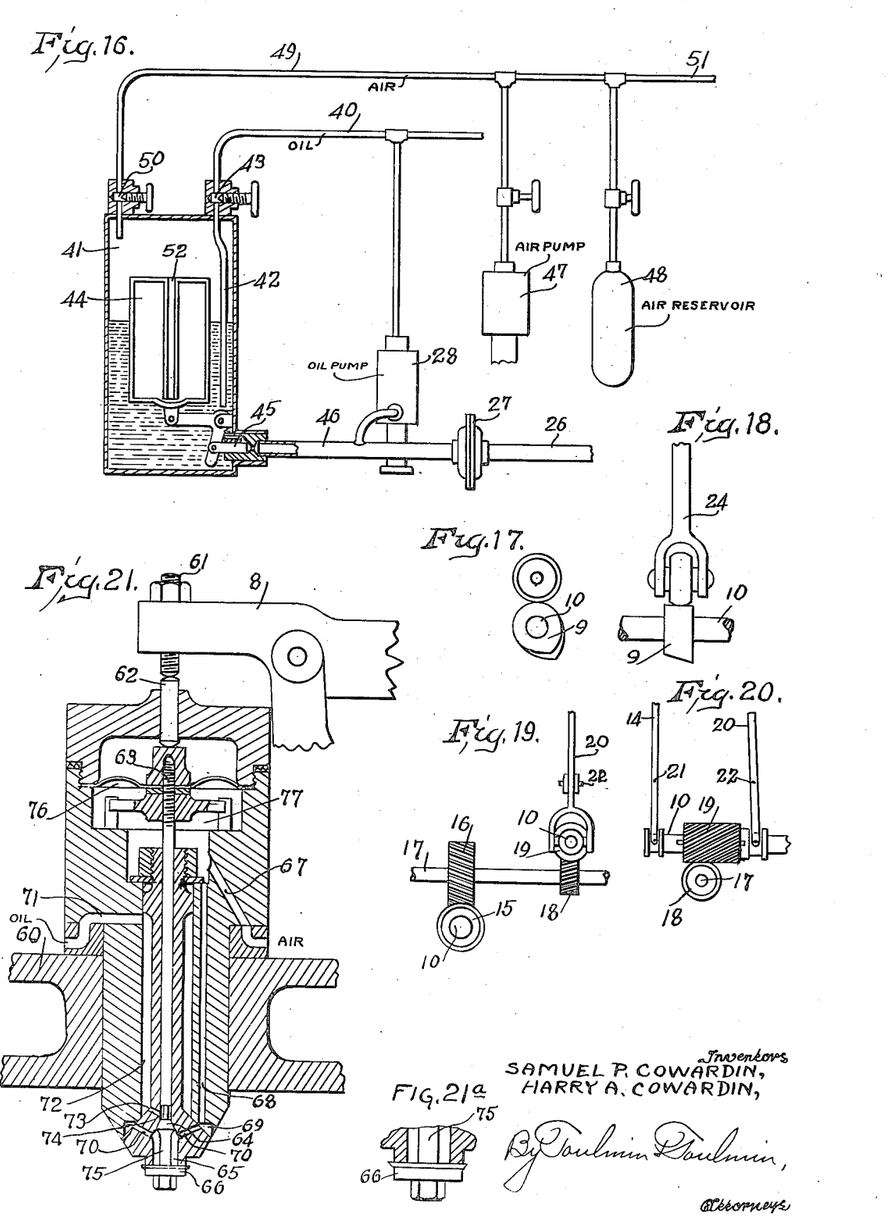

The first step relates to the production of the fuel ingredient of the charge. This step consists of atomizing, say practically any of the hydrocarbon oils or other liquid fuels, by reducing them to such an exceeding fine state of subdivision into particles so minute and hazy that when they are combined with air the result is the production of a fog,—a cloud that will remain suspended in atmospheric air when released from the atomizer. This fog is produced by an atomizer capable of thus reducing the oil into such infinitesimal particles and incorporating them in a small body of air. One such an atomizer is illustrated in Fig. 21 of the accompanying drawings. As will appear hereinafter when this particular atomizer is described in detail, the oil and air each under a pressure, of say 150 to 400 pounds, which is sufficient, meet in a mixing chamber (65) of the atomizer, the air entering such chamber through tangential tuyères (70). These tangential streams of air act violently to break up and atomize the oil and to cause the fine particles to become suspended, as it were, in the air. The pressure of the air and the oil, each at say 150 to 400 pounds per square inch, and the whirling course of the air, both entering the mixing chamber (65) and the rapid passage of the oil and air past the disc 66 combine in their action to reduce the oil particles to such a state of entire atomization as is distinguishable only from a state of vapor or vaporization, which latter state does not occur until this fuel ingredient is subjected to the heat incident to combustion or that immediately preceding ignition. The best illustration we can give of the state of the fuel charge, as it issues from the atomizer and enters the cylinder, is that the charge constitutes a fog made up of the constituents of oil and air.

Figure 1:
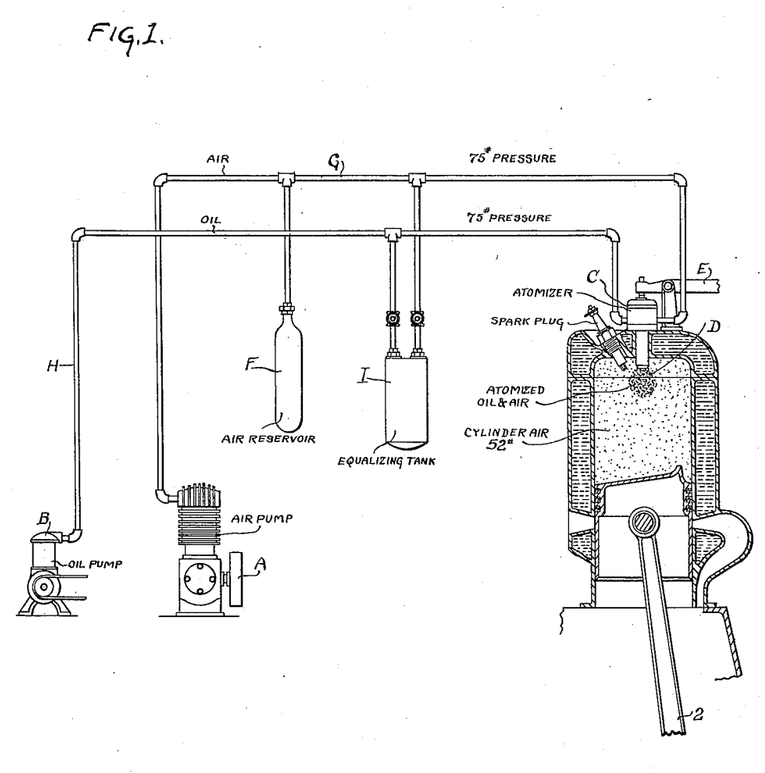
Fig. 1 is a diagrammatic view of an explosive engine, a two-cycle being illustrated for simplification, with the oil pump, air pump, reserve air reservoir and the pipe lines.

Being under the pressure from the air pump A and the oil pump B, equalized in the tank I, as seen in Fig. 1, this fog is delivered by pressure from the atomizer C into the cylinder air, as indicated at D, either in the form of a small cloud instantly flashing into the cylinder air, or projecting stream-like into the cylinder air, according to the nature of the cam or other mechanism which actuates the tappet E which opens the atomizer, as whether the atomizer is opened with a snap or gradually opened for the issuance of the stream.

In Fig. 1 is also shown a reserve air reservoir indicated at F and connected with the air line G. Both the air line G and the oil line H discharge into the atomizer C, as shown in the diagram Fig. 1.

Thus is performed the step of producing the fuel ingredient in the form and nature of a fog.

And thus also is effected the step of injection of the fuel ingredient into the air contained in the cylinder, which we will refer to as the cylinder air.

As above indicated, the quantity of this fuel ingredient is small as compared with the quantity of cylinder air at the time of injection. We prefer to use from one-half to one cubic foot of injection air at atmospheric pressure, to from 100 to 300 cubic feet of cylinder air at atmospheric pressure. Or, otherwise expressed, the air of injection is preferably from one-sixth of one per cent. to one per cent. of the cylinder air. This can be varied without departing from our method, but this is preferable. And it is to be understood also that in this preferred formula the quantity of injection air compared with the quantity of oil contained thereing is small, being generally of substantially the proportion of one-half to one cubic foot of injection air at atmospheric pressure to approximately one-half pound of oil, which together constitute the fog. Such is the composition of the fuel ingredient.

The step of the time of the injection of the fuel ingredient will now be stated. The formula for this injection covers the period from a point of low compression, say about 48 pounds in an engine having a maximum compression of say 120 pounds, to the degree of compression which just precedes the ignition compression, say at a maximum injection pressure of 118 pounds per square inch when the maximum compression of the particular engine at which ignition takes place, is 120 pounds per square inch. Or, as stated in the preamble to this specification, the injection may be performed at any time after the cylinder air has commenced to enter the cylinder, on up to the period when the compression has reached nearly that degree which will cause ignition, according to the character of the particular engine and the character of the fuel oil.

For instance, with respect to the character of the particular engine, the time of injection should be early, in the case of high speed engines so as to give ample time for the preparation or thorough intermixture of the injected fuel with the cylinder air before the time of ignition is reached.

In the case of low speed engines, the time of injection should be later in the compression stroke because even so the slower speed of movement of the piston will give a like period of preparation for the intermixture of the fuel ingredient with the cylinder air before ignition takes place.

Again, the higher the compression of a particular engine the later the injection should be made, while the lower the compression of the engine the earlier the injection should be performed. Thus in engines of the higher compressions this later injection prevents preignition from the heat of compression, while in the case of engines of the lower compressions this earlier injection gives time for the heating of the charge up to the auto-ignition temperature.

Again, in the case of engines in which by their construction and mode of operation the cylinder air is more nearly pure and uncontaminated by the presence of spent gases, the time of injection should be earlier in the compression stroke, so as to give time for the proper preparation and heating of the charge before ignition is to be effected; while in the case of engines which by reason of their construction and operation contain more or less hot spent gases at the time of the admission of the cylinder air, and therefore admix with the cylinder air the heat in these gases, the time of injection should be later in the compression stroke because part of the heat to be derived from compression is diffused in the charge from these hot gases.

For instance, in a two-cycle engine, as an illustration, the time of injection will depend in part upon the nature and character of the fuel oil to be used. In the case of those oils which require a longer period of heating or "warming up," so to speak, the time of injection should be early with respect to the compression stroke of the piston. This is to give time between the time of injection and the time of ultimate compression and ignition for the oil ingredient in the charge, and indeed the whole charge of air and oil to become warmed, or more strictly speaking heated. The longer the period of time between the injection and the ignition the more opportunity the oil ingredient has of becoming thoroughly heated by the increasing heat due to the increasing compression. The same observations apply with respect to a four-cycle engine operated with the same classes of fuel oils.

The rationale of making the injection of the fuel ingredient when the compression is low as compared with the maximum compression of the engine, is:

(a) That by injecting at low compression a low injection pressure may be used; for instance 75 pounds per square inch will be effective for injection when the cylinder air is at 60 pounds compression;

(b) That when the fuel ingredient is injected into the cylinder at low compression there is ample time before ignition for the thorough distribution of the ingredient in and throughout the cylinder air so as to prepare the whole charge for later ignition; and this distribution is effected without refrigeration or cooling of the cylinder air because of the small quantity of injection air contained in the fuel ingredient;

(c) That in our method the pressure of injection need be only substantially that pressure utilized to atomize the oil in the charge to secure a fog-like state of the fuel ingredient, plus the pressure in the cylinder at the time of injection.

The injected ingredient should be of such character that it will cause the whole charge made up of it and the cylinder air to ignite at about the maximum compression of the engine from the heat of compression, however low the degree of such maximum compression may be when ignition heat is obtained. Thus, if the maximum compression of the engine is 120 pounds per square inch, the charge resulting from the distribution of the fuel ingredient throughout the cylinder air should auto-ignite at the temperature produced by the 120 pounds compression.

The amount of air injected as a part of the fuel ingredient should not be more than sufficient to carry the atomized oil, atomized in the sense that when combined with such air a fog is produced, and should not be enough to cause refrigeration of the air in the cylinder.

Again, the quantity of air of injection being small as compared with the quantity of cylinder air, aids in preventing refrigeration of the air in the cylinder, and thus enables us to inject at said low pressures yet without causing any refrigerating effect.

Finally, it will now be understood and appreciated that our improved method can be practiced in explosive engines of ordinary weight and strength, and therefore low cost, and is not confined in practice to engines which are built with a large excess of weight and strength, and consequent great cost, as in a Diesel engine, to withstand the strains of high compression; and which heavy and expensive structures for such high compression are indispensable in Diesel engines and to practice the Diesel system.

And next we will refer to the step of ignition. What we are about to say refers to firing by auto-ignition because our method makes that kind of ignition feasible and preferable in low compression engines. Ignition under our method follows the period of preparation (the period during which the fuel ingredient is distributed throughout the cylinder air), and takes place preferably on or about extreme compression, where ignition temperature is reached. The time of ignition must be placed at or about dead center, and is controlled by the time of injection ahead of the time of ignition by a period equal to the period of preparation in the engine cylinder, or the period of preparation in the particular cylinder of the engine then being operated. This applies to ignition by spark as well as auto-ignition.

In our method the charge is not burned until after the fuel ingredient is distributed in the cylinder air, and is to be distinguished from instances where fuel is burned as injected. Again, our method eliminates the use of all of the usual equipment of hot-plates, hot bulbs, and the like, as our fuel ingredient is injected directly into the cylinder or the cylinder air contained in the cylinder.

When starting the engine it is necessary to first atomize the fuel; and for this purpose the air contained in the upper part of the tank 41 is sufficient. In practice we use a tank pressure higher than the cylinder compression, which latter may be 120 pounds per square inch, or thereabout.

When starting cold it is expedient to direct the fuel ingredient or the oil fog through the spark to ensure ignition, and the spark should occur simultaneously with the fuel admission. After the engine is started and warmed up, the spark may be retarded with reference to the fuel admission with advantage. One form of mechanism for practicing this feature or step of our invention is included in the subject matter of our co-pending application, Serial No. 725,931, filed July 14, 1924.

In practicing our method we can continue to fire by means of the spark, or we can as soon as heated up fire by the heat of low compression.

In order to facilitate an understanding of the practice of our method of operating an explosive engine we have included in the drawings herein certain diagrammatic views and we have also reproduced and made a part of this divisional application the drawings which formed a part of the original application; and embody in the following description essentially the description of these drawings and the engine they illustrate as the same are described in the specification in this parent application.

Figure 2:
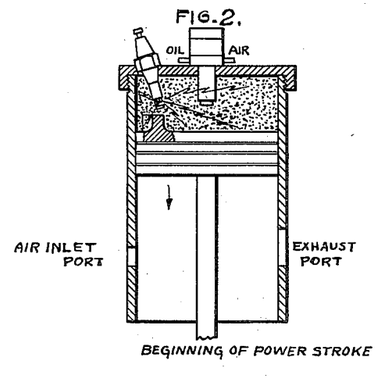
Fig. 2 is a vertical sectional view through a two-cycle engine, shown diagrammatically, equipped with a spark plug and our oil atomizer.

Referring to these diagrammatic illustrations contained in Figs. 2 to 6 inclusive, let it be assumed that in Fig. 2 the piston has already made a cycle and is about to start another cycle. The piston is just beginning the power stroke as the charge has already entered the cylinder, been compressed, and ignited.

Figure 3:
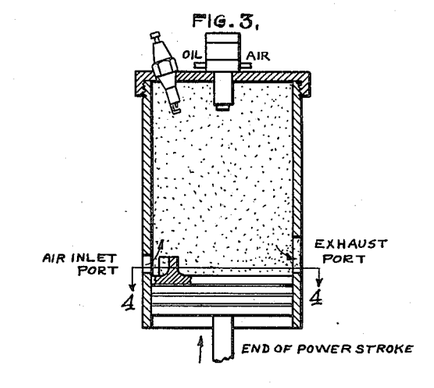
Fig. 3 is a like view with the piston just starting up on the compression stroke.
Figure 4:
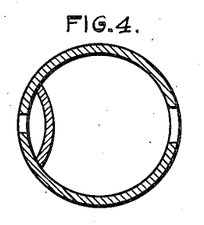
Fig. 4 is a sectional view on the line 4—4 of Fig. 3 looking in the direction of the arrows, showing the piston in plan with its baffle wall in section.

In Fig. 3 this power stroke is ended, the burnt or spent products of the combustion are escaping and a new charge is entering the cylinder.

Figure 5:
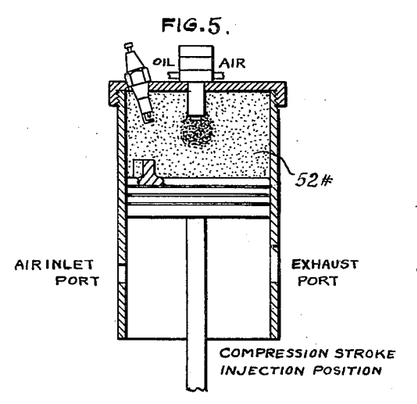
Fig. 5 is a like view to Fig. 3 with the piston at a point where the compression is at say 48 pounds in an engine assumed to have a maximum compression of 120 pounds.

In Fig. 5 the piston has moved from the position shown in Fig. 3 upward on the compression stroke and has reached the position where the charge of the fuel ingredient will be made—injection position of the piston. In an engine of 120 pounds maximum compression the compression may be, say 48 pounds when the piston is in this injection position, as shown in Fig. 5. From that position of the piston on to the ultimate compression position or end of the compression stroke, the fuel ingredient charge will be distributed throughout the cylinder air.

Figure 6:
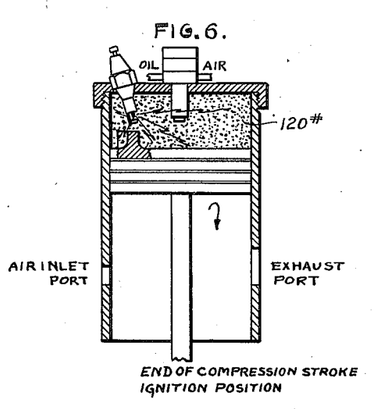
Fig. 6 another similar view with the piston at the point of 120 pounds compression, for ignition.

Such is the state of things as shown in Fig. 6. The compression has been effected, ignition has taken place and the piston is about to start its power stroke or leave its ignition position. An instant later the piston will actually begin its power stroke, the condition shown in Fig. 2.

So much for the operation when the method is applied to a two-cycle engine.

Figure 7:
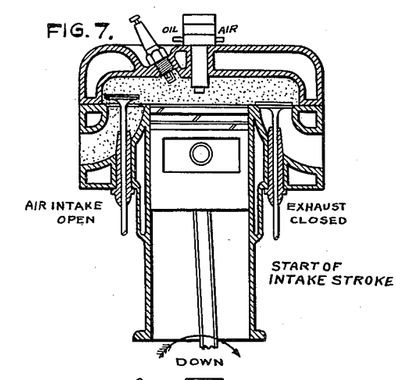
Fig. 7 is a vertical sectional view of a cylinder with its head, inlet and outlet ports and valves, and its piston starting on the down or intake stroke, illustrative of a four-cycle type of engine.

We shall now refer to the operation when our method is being practiced in a four-cycle engine. In Fig. 7 the intake stroke is assumed to be just starting, with the intake valve open and the cylinder air entering.

Figure 8:
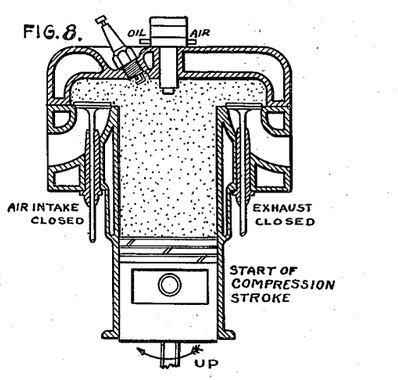
Fig. 8 is a like view showing the piston starting on the up or compression stroke.

In Fig. 8 the cylinder air has been drawn in, the intake valve closed and the piston is just in the act of starting on the compression stroke.

Figure 9:
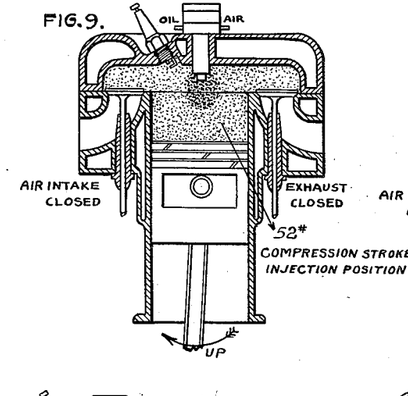
Fig. 9 is a like view with the piston further up on the compression stroke at a point of partial compression, say 48 pounds.

In Fig. 9 the piston has reached the injection position or position of the piston when the fuel ingredient is to be injected. The piston is so indicated in the figure. In an engine of 130 pounds per square inch maximum compression, the compression may be 52 pounds when the piston is in this injection position. Then it is that the fuel ingredient is injected through the atomizer, and from that time on to the limit of the compression stroke this ingredient is being distributed through the cylinder air.

Figure 10:
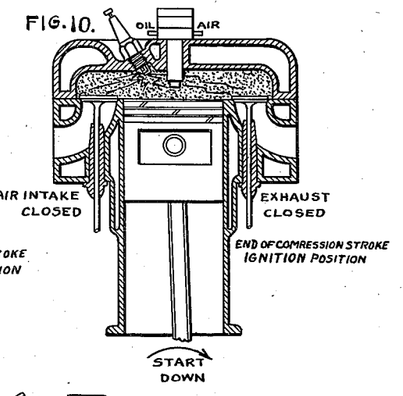
Fig. 10 is a similar view with the piston having completed the compression stroke, ignition having occurred and the piston starting on the down or power stroke.

Fig. 10 shows the end of the compression stroke and the ignition position of the piston, which is just in the act of starting on the power stroke.

Figure 11:
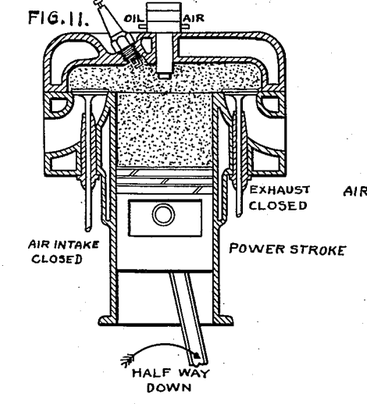
Fig. 11 is a similar view with the piston half way down on the power stroke.

Fig. 11 shows the piston approximately half way down on the power stroke.

Figure 12:
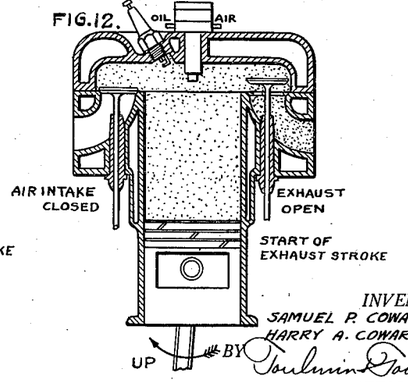
Fig. 12 another similar view with the piston starting on the up or exhaust stroke.
Figure 13:
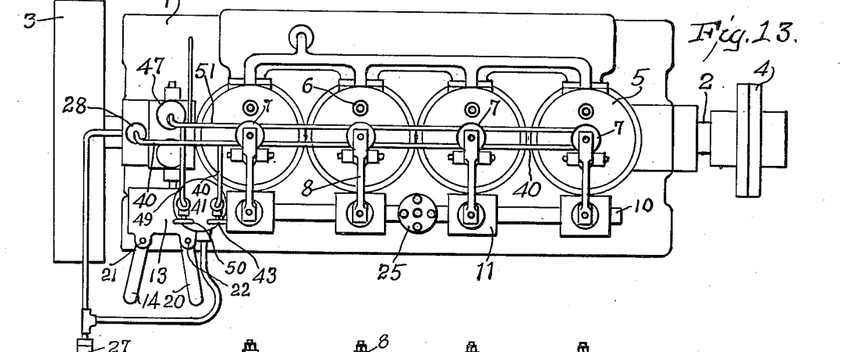
Fig. 13 shows our engine in plan.
Figure 14:
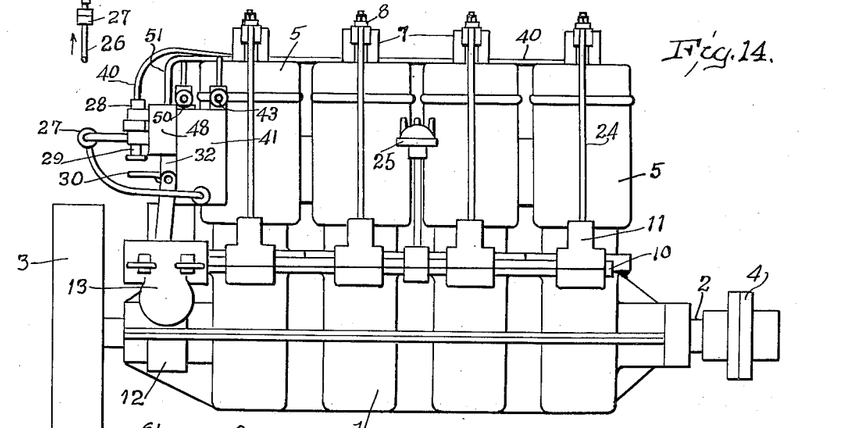
Fig. 14 is a side elevation.
Figure 15:
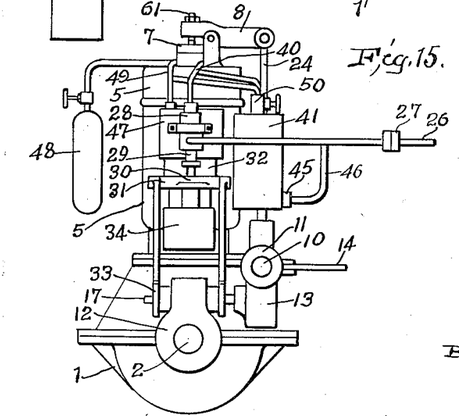
Fig. 15 is an end elevation.

Fig. 12 shows the piston just starting on the exhaust stroke, with the exhaust valve open. It will proceed throughout the exhaust stroke and then start again on the intake stroke, as shown in Fig. 7.

Thus it will be understood that when our method is applied to an engine of the four-cycle variety the cylinder air is drawn in on the intake stroke; the cylinder air is compressed, to some degree between the starting and ending of the piston compression stroke, when the fuel ingredient is injected into it, preferably when the compression is yet low, which gives time for the thorough distribution of the fuel ingredient before ultimate compression; and that ignition takes place at or about the end of the compression stroke.

In the description above given with reference to the use of the method in a two-cycle and a four-cycle engine, we have purposely refrained from repeating or stating those steps of the method by which the fuel ingredient charge is produced, the character of the charge and the manner of its injection, as by pressure, because these steps are previously stated following the description of the figures of the drawings.

In Figs. 13, 14 and 15, 1 is the engine base or crank-case; 2 is the crank-shaft; 3, the flywheel; 4 the coupling. The cylinders of a four-cylinder engine are indicated at 5. In the cylinder heads are the spark plugs 6 and the atomizers 7. The atomizer valves are operated by tappet mechanism 8, which are in turn operated by cams 9 mounted on the cam shaft 10. The cams are housed in housings 11 in Figs. 13 to 15, and are shown in detail in Figs. 17 and 18. Inclosed in housings 12 and 13 are gears connecting the crank and cam shafts. See Figs. 19 and 20. The levers 14 and 20 are shown in a vertical position in the latter figures for the sake of clearness, whereas they are shown in an horizontal position in Figs. 14 and 15.

Gear 15 is mounted on the crank-shaft, and actuates the gear 16 mounted on the jack-shaft 17. On this jack-shaft is mounted the gear 18 which meshes with the gear 19 mounted on the cam-shaft 10. The gear 19 is slidably mounted on the cam-shaft 10, so that while the gear drives the cam-shaft, its position in the length of the cam-shaft may be changed. Lever 14 is pivoted at 21, and lever 20 at 22. Lever 14 is used to slide the cam-shaft 10 lengthwise in its bearings. Lever 20 is used to slide the gear 19 lengthwise on the cam-shaft to change its relation with the gear 15. When the lever 14 is operated, the position of the tapered cam 9, (Figs 18 and 20), is changed with relation to the tappet rod 24. When the cam-shaft is moved to the left, as shown, the greater circumference of the cam comes into operating contact with the tappet roller, and a greater opening is given to the atomizer valve; and vice versa. When the lever 20 is operated, the angular relation of the crank-shaft and the cam-shaft is changed.

On the cam-shaft is mounted the distributor gear 25 (see Figs. 13 and 14); consequently operating the lever 20 changes not only the time of fuel admission to a given cylinder, but also the time of firing the charge. When electric ignition is used, though adjustments may be made to vary the relative timing of the spark and of the fuel admission; the said timings are practically synchronous.

Fuel oil is brought from a supply tank by the pipe 26; passes through a strainer 27; is drawn from the pipe 26 by the oil pump 28, the plunger 29 of which may be operated by the finger 30 attached to the cross-head of the air pump 31. This air pump cross-head, attached to the air pump plunger 32, is actuated by eccentrics 33, mounted on the jack-shaft 17. The air pump here shown is here much larger than is necessary for supplying air to the atomizer, and in the case of a marine engine may be used for whistle signals and other purposes; while the lower part of the pump 34 may be used for water, bilge, etc. For the purpose of atomizing the fuel oil we find that an air compressor having a cylinder volume of one-half of one per cent. of the total engine cylinder displacement is ample. In other engines of the two-cycle type, the compressor volume is often from 10 to 15 per cent. of the cylinder displacement.

The oil pump 28 pumps the oil into the line 40. Going to the left in this line (Fig. 16) the oil enters the equalizer tank 41 by the pipe 42 through the cut-off valve 43. When the oil level in the tank 41 rises above the desired level the float 44 rises, opens the valve 45, and allows the oil to circulate around the loop formed by the pump 28, the pipe 42, the valve 45, and the connecting pipe 46. When the oil level drops in the tank 41 the valve 45 closes, and the oil level is raised by the pump 28.

In Fig. 16 the numeral 47 indicates the air pump; 48 is the air-bottle or reservoir tank. Both air pump 47 and reservoir 48 are connected with the air line 49, which at one end enters the equalizer tank 41 through the cut-off valve 50. The other end 51 of the air line is connected to the atomizers 7. The oil line 40 is also connected to the atomizers 7 (see Figs. 13 and 14). At whatever pressure the air is delivered in the equalizer tank 41, the same pressure is exerted on the surface of the oil in the said tank. Suppose that this pressure is 300 pounds per square inch; then air will be delivered to the atomizers 7 through the lines 49 and 51 at a pressure of 300 pounds; and oil will be delivered through the pipe 42 and the line 40 to the atomizers at a pressure of 300 pounds. Whatever the air pressure may be, the oil pressure will be the same. If the oil pressure in line 40 and pipe 42 rises above the pressure of the air, the rise is neutralized by the mounting oil level in tank 41 opening the circulating valve 45. The float 44 is open; the inside communicating with the outside by the pipe 52. The air underpressure in the tank 41 also enters the float 44. If the air pressure falls, the air inside the float expands, driving out any oil which may have found its way in. This form of float, though open, is always buoyant.

When starting the engine, it is necessary to first atomize the fuel; and for this purpose the air contained in the upper part of the tank 41 is sufficient. The cut-off valves 43 and 50 are closed when shutting down the engine; but in case of a slow pressure leak at any point, a reserve of compressed air may be kept in the small reservoir 48. In such case, air for starting is taken from the reservoir 48 instead of from the air pump, which of course is not operating. In practice we use a tank pressure of a little above the cylinder compression, which may be 120 pounds per square inch or thereabout. A lower pressure than this even is sufficient for atomizing the fuel; and in the absence of a reservoir air tank 48, lost pressure can easily be built up by means of an ordinary automobile tire pump.

Having delivered our air and oil at our atomizers, under equal pressure, we are now ready to admit a charge to the atomizer and to the cylinder. While any good atomizer designed to receive air and oil and to cause them to mix and produce the fuel ingredient as hereinbefore stated, and to be then discharged and injected into the engine cylinder, may be used, we illustrate in Fig. 21 of the drawings an atomizer which we have fully described in another application, filed in the United States Patent Office on April 3, 1924, Serial No. 703,972. The atomizer body is secured in the cylinder head 60. The tappet pin 61 secured in the tappet lever 8, strikes the pin 62, which in turn depresses the valve stem 63, at the lower end of which is the valve 64, which closes the opening into the upper end of the mixing chamber 65; and at the extreme end of which is the valve 66, which on the depressing of the valve-stem 63 opens to allow the air and oil fog to enter the cylinder. Air enters the atomizer by the passages 67 and 68. From the latter it enters the annular chambers 69, from which it enters the mixing chamber by the tangential tuyères 70. Oil enters the atomizer by the channel 71, and passes down the annular space formed between the body of the atomizer and the valve-stem sleeve 72 to the passage 73, into the chamber 74 formed around the valve-stem and above the valve 64, the length of the time and extent of the opening of which measure the quantity of oil admitted to the chamber 65. As soon as the air pressure is turned on, and the cocks 43 and 50 (Fig. 16) are opened, we have air pressure in the mixing chamber 65, and oil at a like pressure in the chamber 74 above the valve 64. Upon the valve-stem 63 being depressed, the air at once flows around the chamber 65, meeting and breaking up the oil film which flows in around the valve 64. The mixture of atomized oil and air then enters the cylinder by the now open valve 66. This valve is of an annular type, and is provided with a fin which directs the film of atomized oil issuing from the valve. Upon the raising of the tappet 61, the valve-stem 63 is returned to its closed position by air pressure in the chamber 77 acting on the under side of diaphragm 76, which is of the corrugated disc type; and which, seated in the rabbett of the atomizer head and held down by the cap, prevents the escape of air from the chamber 77 except by way of the valve 66. We obtain a very finely divided product or fog of oil and air. In order to start after a shut-down of considerable length, and when the cylinder is practically cold, it is necessary to ignite the fuel fog by some outside agency. We use the electric spark. To ensure ignition it is desirable that the fog issuing from the valve 66 be directed through the spark gap.

In some engines other than ours a compression of 510 pounds is used, and 350 pounds is required for the firing of the charge. The excess of the compression is needed to compensate for the refrigerating effect of an excess of injection air. We use a compression of about 120 pounds per square inch, and we attribute our success in firing our charge with the heat of this low compression in part to the fact that we properly proportion our air of atomization with the oil to be atomized, and that we practically eliminate any refrigerating effect due to the expansion of the air of injection in the cylinder.

We will now describe the starting of an engine by our method of operation. These engines are started from the state of cold rest by injecting a charge of the fuel ingredient into a cylinder, the piston corresponding to which is somewhere in power stroke position, and igniting this charge by an electric spark. The resulting combustion produces pressure within the cylinder sufficient to start the engine. Under these conditions the pressure of the cylinder air need not be, and usually is not, more than atmospheric.

Engines having three or more equally spaced power impulses per revolution always have at least one piston somewhere in the power stroke, and against which an explosion will be effective for starting the engine. It is then only necessary to provide suitable means for performing the steps of injecting and igniting the fuel ingredient in the cylinder, which means are provided by a wide range of adjustment of the point of simultaneous injection and spark in advance and retard of top dead center. This is done in the engine here shown by the lever 20 and the amount of fuel injected is controlled by the lever 14.

Figures 22, 23:
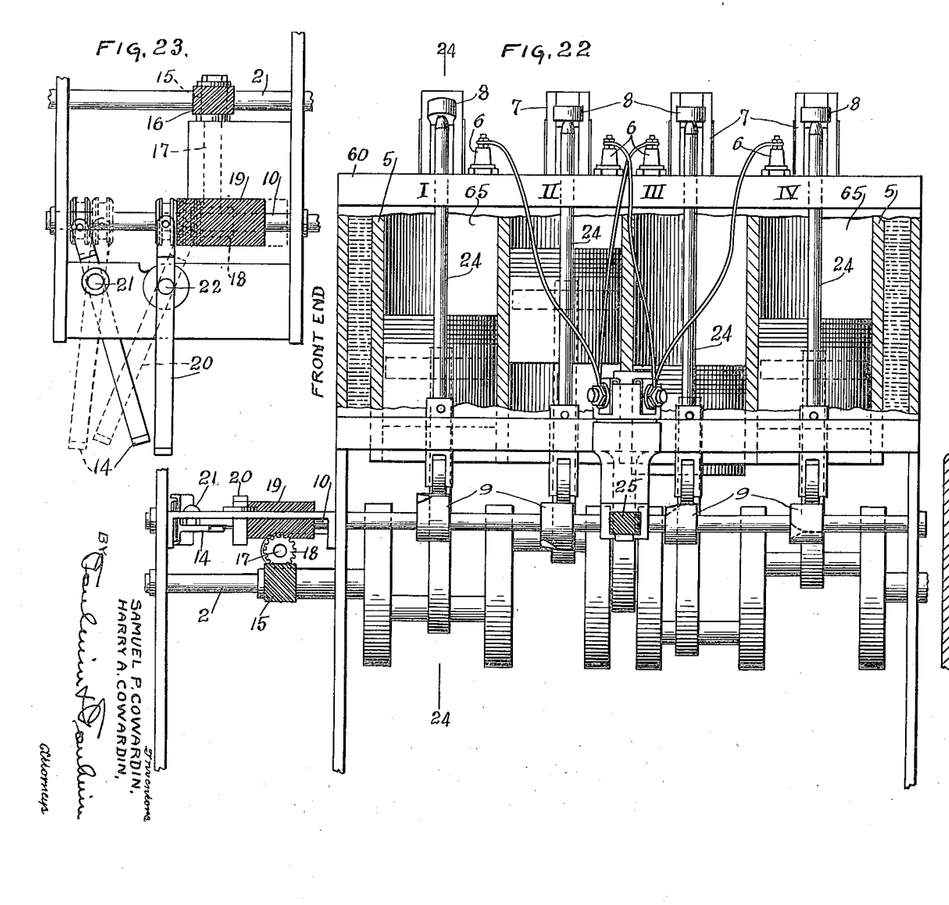
Fig. 22 is a side elevation of the engine shown as a whole in Figs. 13, 14 and 15 with a portion of the cylinders removed or broken off to show the position of the pistons; in which figure the parts are in position for admission of a charge into cylinder I and the firing by spark of such charge.
Fig. 23 is a plan view of the crank shaft and cam shaft with their connecting gearing and of the throttle lever (14) and timing lever (20).
Figure 24:
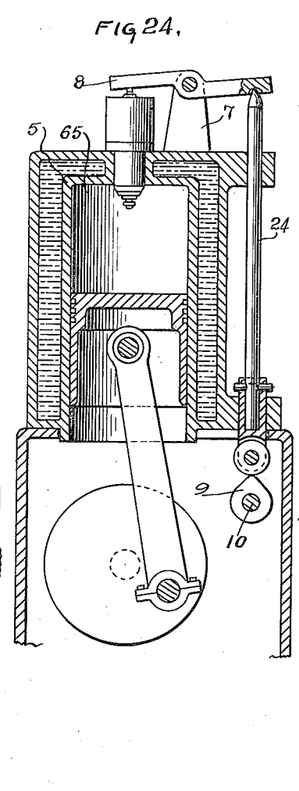
Fig. 24 is a section on the line 24—24 of Figure 22.

Consider a conventional four-cylinder two-cycle engine, Fig. 22. This engine will have four equally spaced impulses per revolution. The four cranks will be 90 degrees apart, and one of these is always somewhere in the first quadrant of the crank circle. Also assume clockwise rotation.

If an engine is running at 10 degrees retard, then injection, spark and ignition of the charge occur when the cranks are 10 degrees past top dead center and this corresponds to a 10 degree retard setting of the cam shaft in the engine described herein. Therefore, if the engine were standing still with one crank on the 10 degree position and the cam shaft (controlled by lever 20) were moved by hand to 10 degree retard position, it would cause an injection and spark in that cylinder, which, as stated above, would start the engine.

Similarly, if the engine is running at 30 degree retard, injection, spark and ignition would occur when the cranks are 30 degrees past top dead center corresponding to a 30 degree retard setting of the cam shaft, and if the engine happened to be standing with one crank on the 30 degree position, rotation of the cam shaft to the 30 degree retard setting would cause injection and ignition of the fuel ingredient in that cylinder and the starting of the engine.

This would be true if the engine stopped with a crank at 10 degrees, 30 degrees, 45 degrees or even 100 degrees past top dead center or at any intermediate position. Therefore when it is desired to start the engine, such as herein set forth, by our method the cam shaft is first placed at the 100 degree retard setting (with lever 14 in the off or closed position). Then after moving lever 14 to the on or open position and with the spark switch closed, continuously advance the cam toward the point of zero retard, it will cause injection and ignition of the charge in the cylinder whose crank is standing anywhere between the 100 degrees position and top dead center.

If the engine is to be run in the opposite direction or counter-clockwise, the events we have just described will take place in the fourth quadrant of the crank circle instead of in the first, and to start the engine in that direction the cam shaft should be placed in the 100 degree retard setting for that direction of rotation or the 260 degree angle of the crank circle and moved through 270 degrees, 300 degrees, 330 degrees on to the 360 degree or 0 degree position. This will cause injection and ignition of the fuel ingredient in the cylinder whose crank is between 260 degrees and top dead center and the engine will start counter-clockwise.

If a reversible four-cylinder two-cycle engine were used in utilizing our method, it should therefore have a cam shaft capable of being rotated 200 degrees with respect to the crank shaft, 100 degrees in advance and 100 degrees in retard.

To start the engine herein illustrated by our method, first place the cam shaft in the 100-degree retard position for the desired direction of rotation. Place the lever 14 in the "open" position (full line position in Fig. 22) and close spark circuit. Return the cam shaft to central position and then after the engine is under way, to running position. After the engine has been thus started, on spark, and has "warmed up," the spark may be cut off as ignition will now take place from the heat of compression, so sensitive to ignition is our charge.

Such is the principle involved in the starting and operating of an engine when used in practicing our method. But in order to simplify and make more plain the starting, operating and stopping of an engine when practicing our method we call attention to Figs. 22 and 23 of the drawings herein. Let it be supposed that the engine is to be started when in a cold state. First see that lever 14 is in the dotted line or closed position (Fig. 23) which is its position when the engine is at rest. This will withdraw the actuating parts of the cams 9 on the cam shaft 10 to one side of the tappet rods 24. Then move the timing lever 20 from full line to dotted line position (Fig. 23) which movement is sufficient to rotate the cam shaft through an arc of 100 degrees, thus retarding the cams and consequently the time of injection and spark in respect to the top dead center of the pistons. Then move the throttle lever 14 to full line position (Fig. 23). This movement will cause the actuating parts of cams 9 to be returned to their original position in line with tappet rods 24. Then move the timing lever 20 back to the full line position. This movement of lever 20 will result in the actuating parts of one of the cams being brought into contact with the roller on the corresponding tappet rod 24, and will thus lift the rod and open the atomizer by actuating the tappet 8, causing a charge of fuel to enter the cylinder. In the example given it happens that injection will take place in cylinder No. I as shown in Fig. 22.

In the example now being given it happens that the crank of cylinder No. I is off dead center and its piston is in a position to exert a power stroke clockwise facing the front end as designed in Fig. 22, when the charge passing from this atomizer enters this cylinder and ignites. This it will do in this instance because in moving the timing lever 20 as before stated it also set the timer 25 to close the circuit of this cylinder No. 1.

Therefore by the mere described manipulation of the throttle lever 14 and timing lever 20 the charge will be admitted into cylinder No. I and ignited, and the piston of that cylinder will make a power stroke and thus start the engine. In quick succession the remaining cylinders and their pistons exert power strokes; in the example under consideration the next cylinder and piston to so act will be No. III because the cam and tappet rod next to come in operation in this example will be the cam and tappet rod belonging to cylinder No. III. And it will be noted too that the wrist pin and this cylinder piston, when such cam and roller come together will be off dead center, so that a further clockwise torque movement of the shaft will occur.

When the engine is thus started it will continue automatically igniting on spark until such time as the operator opens the spark circuit, in any conventional way, after which it will operate on auto-ignition. That is to say, the charge will ignite from the heat resulting from the compression of the charge. If the engine is cold when first thus started the operator will wait until it is warmed up before shifting to auto-ignition. But if the engine has been running and is what might be called hot at the time of starting again, then the change from spark ignition to auto-ignition can be made almost immediately.

It will be understood, of course, that after the engine parts have been set in the manner stated the engine is thus started by the method steps comprising fuel production, injection of the fuel ingredient, and spark ignition, regardless of the steps of compression and distribution of the fuel ingredient, so far as concerns the cylinder and piston thus initially operated; but that as to the other cylinders and pistons the full method comes into play, that is to say, the step of producing the fuel ingredient charges delivered by the atomizing agent, the step of injection at low compression; the step of distribution of the fuel ingredient, and the step of ignition, either first by spark and then by auto-ignition or continuously by spark if that be desired, all taking place in the order here stated.

Though high compression may be desirable from a thermal standpoint, it does not always result in a net economy. We need only enough compression to fire a charge of the fuel ingredient when intimately mixed or distributed through a sufficient volume of compressed air. The volume of this injection air is so small that the refrigerating effect of its expansion in the cylinder is negligible; consequently high compression to overcome refrigerating effects is unnecessary. We also proportion the volume of air used for atomization to the volume of oil to be atomized, as before stated. The charge of the fuel ingredient admitted to the cylinder is practically of uniform quality; and the quantity of this charge admitted to the cylinder is varied by the throttle lever 14, in the engine shown. The air pressure for atomization may be as low as 60 pounds per square inch and lower; but for running, and particularly when we fire by the heat of compression, we use an air pressure for atomizing a little above that of the compression, which may be around 120 pounds per square inch. Obviously, when we fire by compression, the pressure of atomization must exceed the pressure of compression, or we could not introduce the charge.

The oil is atomized as it enters the mixing chamber of the atomizer by the incoming jets of air under pressure entering the mixing chamber by the tangential tuyères 70; the oil and air then become thoroughly mixed while rotating in and passing through the mixchamber; and the mixture or fuel ingredient expands to a lower pressure than that at which the oil and air enter the mixing chamber, and so the velocity of the spray issuing from the atomizer into the combustion space is low and allows the spray to burn closer to the atomizer and before it can come into contact with the surfaces of the cylinder. We have referred in preceding statements to the pressure of atomization, under which term we also included the pressure of injection.

As stated, the foregoing description of one form of engine in which our method may be practiced, has been included in this specification, as also the drawings of such engine, in order to facilitate an understanding and appreciation of the method itself. But it is to be distinctly borne in mind that our method is equally adapted for practical use in operating any of the well-known explosive engines.

While we prefer atmospheric air as one of the constituents of the fuel ingredient, it is to be understood that any available gas might be employed instead of the air, such for instance, as the waste gases derived from the combustion and explosion of the fuel charges in the engine cylinders.

It will be understood that our method in its general aspect embraces compressing the air in the cylinder to a given point, then injecting the produced explosive ingredient, then still further compressing and, upon achieving maximum compression and maximum temperature, initially firing the charge by other means than auto-ignition, followed by continuing with the auto-ignition of the charge.

It is to be understood that the statement in this specification and the appended claims that the air is less in quantity than the quantity of oil in the fog, has reference to the relative quantities as determined by weight. For instance, taking one cubic foot of free air per brake horse-power (which is conservatively high) and .6 of a pound of oil per brake horse-power per hour (which is about the amount used) the weight of such quantity of air will be about .075 pound per brake horse-power per hour. This is on the assumption that we have free air at about 70 degrees F.

It is further to be understood that this statement as to the quantity of air being less than the quantity of oil in the fog comprehends also that condition in which the quantity of air and the quantity of oil (determined by weight) approach the line of sameness of relative quantities and thence on down through stages of very definitely less quantities of air than oil in the fog which they create. For instance, as an example, we may use .6 pound of oil and 8¼ cubic feet of air, which constitute an approach to said contemplated relation of the quantity of these ingredients in our injection fuel.

The term spark or electric spark used herein is to be understood to include any means of ignition other than auto-ignition.

We have hereinbefore referred to effecting ignition at low degrees of maximum compression. By this we mean to be understood as saying that we can, and do, ignite by the heat of compression obtained in engines of low maximum compression, say as low as 250 pounds, and thence on down to a maximum compression as low as 115 pounds per square inch, more or less. This ability to ignite from the heat obtained by such low degrees of maximum compression results from the invention herein set forth, and largely from the character and quality of the fuel ingredient hereinbefore described. We conceive ourselves to be the first persons to have been able to auto-ignite on such low maximum compressions. And, of course, we can also auto-ignite at any of the high degrees of maximum compression obtained in high compression engines such as those which range from 250 pounds upward.

We would also observe that the terms "explosive engines" or "internal explosive engines" as used herein are to be deemed to include also internal combustion engines.

It will be understood that we desire to comprehend within our invention such modifications as may be necessary to adapt it to varying conditions and uses.

Having thus fully described our invention, what we claim as new and desire to secure by Letters Patent, is:

1. In a multi-cylinder fuel injection internal combustion engine embodying ignition means, independent timing means therefor, injection means, means for varying the amount of injection, and means for varying simultaneously the time of injection and the time of ignition; the method of starting the engine comprising the following steps, to wit: setting the independent ignition timing means to cause ignition during injection; setting the amount varying means to no injection; moving the simultaneous timing control to full retard; adjusting the amount varying means to provide some injection, and gradually advancing the simultaneous timing control until injection and ignition occur.

2. The method of operating an internal combustion engine by admitting air, introducing into the air a liquid fuel in a sufficiently finely atomized condition to explode at atmospheric pressure by ignition, without employment of means for conditioning the fuel subsequent to its introduction into the engine, and igniting the charge.

3. The method of operating an internal combustion engine by admitting air, introducing into the air a liquid fuel in a sufficiently finely atomized condition to explode at atmospheric pressure by ignition, without employment of means for conditioning the fuel subsequent to its introduction into the engine, igniting the charge by an ignition means until the engine is warmed, then cutting off the ignition means and igniting by compression alone.

In testimony whereof, we affix our signatures.

SAMUEL P. COWARDIN.
HARRY A. COWARDIN.